Aug. 11, 1959 J. E. MAYER 2,899,212
GOLF BAG CART
Filed March 15, 1956 2 Sheets-Sheet 1
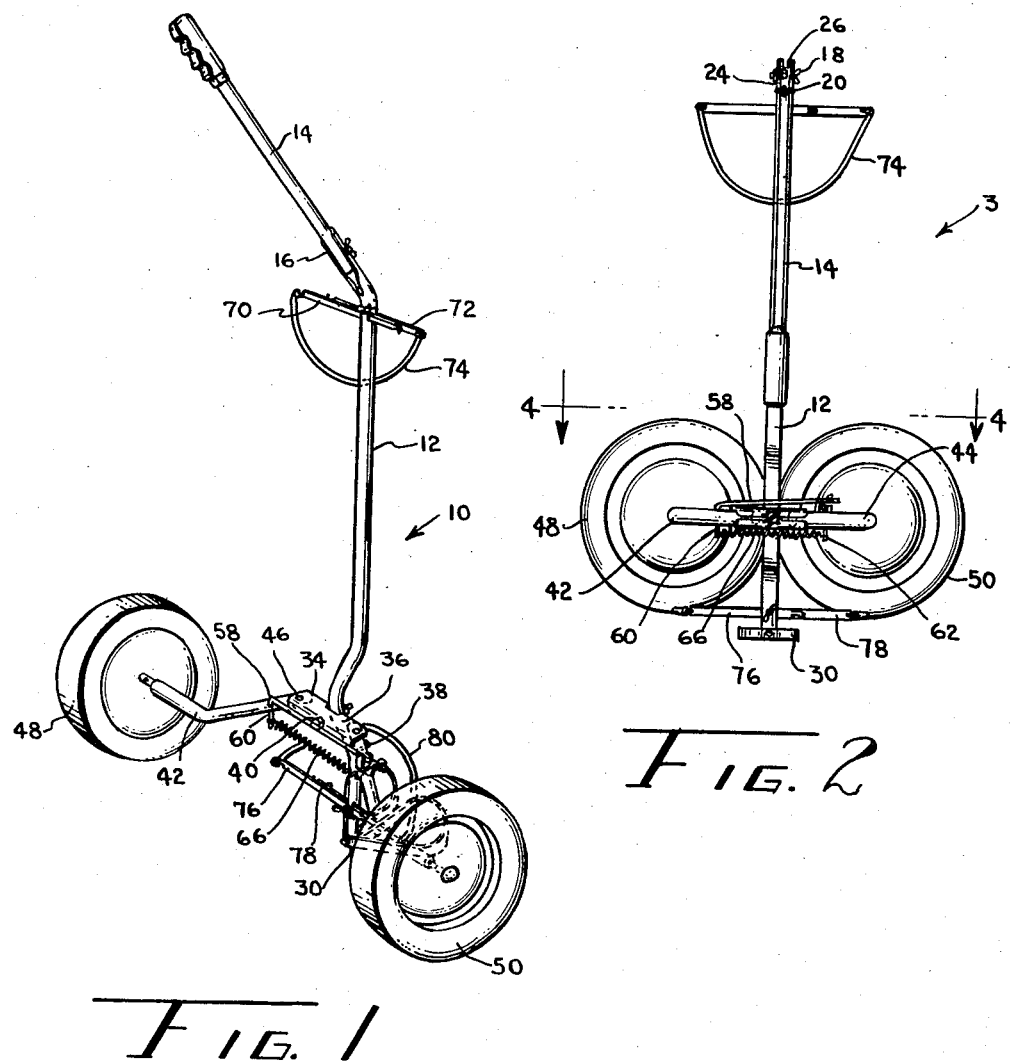
INVENTOR.
JOSEPH E. MAYER
BY
John L. Woodward
ATTORNEY

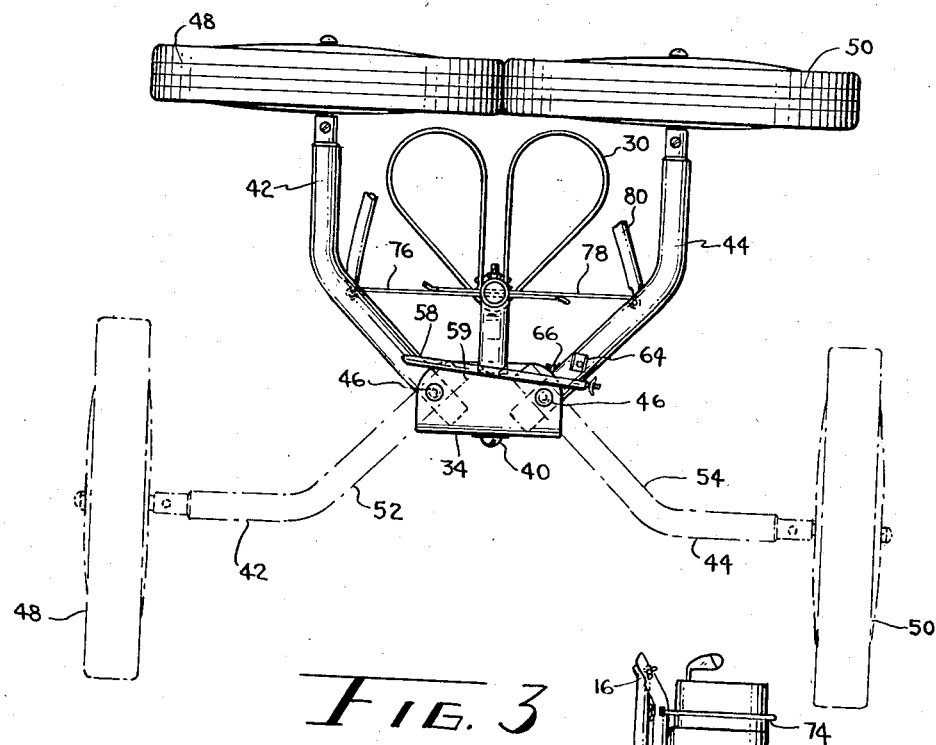
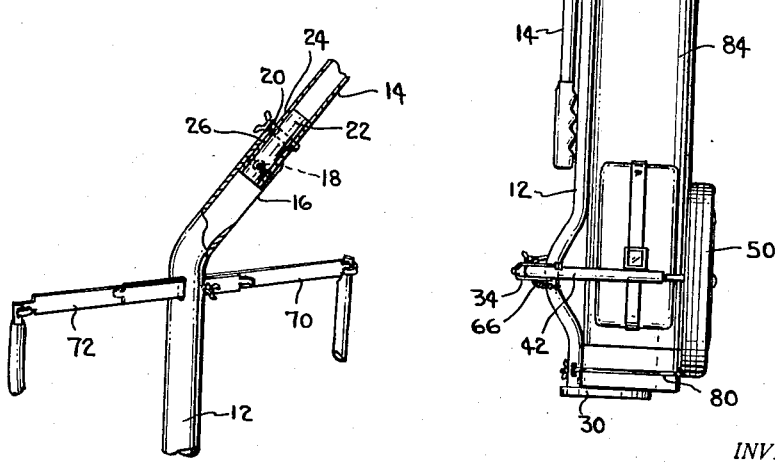

United States Patent Office 2,899,212
Patented Aug. 11, 1959

2,899,212

GOLF BAG CART

Joseph E. Mayer, Minneapolis, Minn.

Application March 15, 1956, Serial No. 571,786

4 Claims. (Cl. 280—38)

This invention relates generally to vehicles and particularly to carts for transporting golf bags.

It is an object of this invention to provide a cart which can be folded or collapsed into a minimum space, so as to be conveniently packed away in a locker or in the back of a car.

Another object of this invention is to provide in a foldable cart, means for holding the folded parts in their folded position.

It is a further object of this invention to provide in a collapsible cart, wheels and arms so arranged that they can be folded around the lower end of the frame into a compact unit.

It is still a further object of this invention to provide in a foldable cart, means for securely holding the elements of the cart in operative position.

With the foregoing and other objects in view which will appear as the description proceeds, the invention consists of certain novel details of construction and combination of parts hereinafter more fully described and pointed out in the claims, it being understood that changes may be made in the construction and arrangement of parts without departing from the spirit of the invention as claimed.

Referring to the drawings:

Figure 1 is a perspective view of the golf bag cart in operative position.

Figure 2 is an elevational view looking at the golf bag cart in folded position from the front of the device.

Figure 3 is a side elevational view of the cart shown in collapsed position.

Figure 4 is a sectional view taken on line 4—4 of Figure 2 disclosing the wheel assembly in inoperative position.

Figure 5 is a fragmentary view of parts enlarged, of the locking means for the handle, the extensible bars for the straps used to hold a golf bag on the cart.

Referring in detail to the drawings, 10 is a golf bag cart comprising a substantially vertical or upstanding member 12 formed of hollowing tubing. A handle 14 of hollow tubing fits into a cut out portion 16 in the upper portion of the upstanding member 12 and is pivotally mounted to the upper end of the member 12 by a bolt and nut means 18. A screw pin 20 is secured to a plug at 22 slidably carried on a small tubing mounted on bolt 18 in the lower end of the handle 14. The shank of the screw pin 20 extends into a slot 24 in the handle 14. When the handle 14 is in the operative position (see Figure 1), the shank of the screw 20 has been moved into a slot 26 in the member 12 and the screw 20 tightened to hold the handle 14 in its operative position. When the screw 20 is unscrewed and pulled up in the slot 24 in the handle 14, the handle 14 can be moved to its folded position (see Figure 3).

A foot or support member 30 is appropriately fastened to the lower end of the member 12 as by screws.

A hinge plate or anchor means 34 comprising spaced apart upper and lower members 36—38 (see Figure 1).

The anchor means 34 is secured to the member 12 by bolt and nut means 40. A pair of arms 42, 44 are pivotally mounted to the plate 34 by pins 46 adjacent their inner ends. Wheels 48, 50 are journalled by stub axles to the outer ends of the arms 42, 44 respectively. The arms 42 and 44 both extend outwardly and rearwardly, then outwardly from the hinge plate 34 as at 52 and 54 (see Figure 4) for a purpose to be set forth hereinafter.

A rod 58 is provided with a depending portion 60 which extends through arm 42 by means of apertures in the arm 42. A rod 62 is mounted in the aligned apertures in arms 44 adjacent its pivot end and is provided with a keeper 64 on its upper end which abuts the top of arm 44. A contractible spring 66 is secured between the lower ends of the rods 58 and 62 with a tension on the spring 66 when the arms 42, 44 and their wheels 48, 50 are in extended or operative position (see Figure 1 of the drawings).

The spring 66 is positioned behind the pivots 46 for the arms 42, 44 when the arms are in their fully extended position.

The outer end of the horizontal portion 59 of the rod 58 is screw threaded and a wing nut is carried thereon. The outer end of the horizontal portion 59 of the rod 58 is adapted to be inserted or mounted in the keeper 64 and the wing nut on the rod 58 is tightened to firmly secure the arms 42, 44 and their wheels 48, 50 in extended position. The wing nut on the rod 58 is adapted to take up any tolerance and wear in the wheel assemblies so that the cart is free of rattles. The wheels 48, 50 are in parallel planes when the arms 42, 44 are in their fully extended position.

A pair of bars 70, 72 are slidably mounted in aligned slots in the upper portion of the vertical frame member 12. The bars 70, 72 can be moved inwardly or outwardly of each other, and a wing nut mounted on the member 12 holds the bars in their adjusted positions. A strap 74 having grommets at its opposite ends is releasably secured to hooks on the outer end of the bars 70, 72. The inner end of the bars are provided with a bent portion to prevent the bars being pulled out of the member 12. A second pair of bars 76, 78 of similar construction to bars 70, 72 are mounted in slots in the lower portion of the member 12. A strap 80 similar to strap 74 is carried by the bars 76, 78.

A golf bag 84 is adapted to be transported by the cart 10. The end of the golf bag 84 sets on the foot 30, and straps 74, 80 hold the bag against the frame 12. The extensible bars 70, 72 and 76, 78 permits larger golf bags to be mounted on the cart 10.

The cart 10 as shown in Figure 1, is in operative position, and a person by grasping the handle 14 can pull the cart along a golf course with very little effort.

If a person wishes to store the cart 10 in the back of a car, the wing nut on the end of the rod 58 is unscrewed and the rod 58 lifted out of the keeper 64. Arm 42 is then moved around the frame 12 in substantially horizontal planes until the wheel 48 is to the rear of the support 30. Then arm 44 is pivoted around the frame 12 in horizontal planes until wheel 50 is to the rear of the support 30 and wheel 50 is in alignment with wheel 48. The pivotal arms 42 and 44 being moved to their folded position moves the contractile spring 66 across the pivots 46 for the arms 42, 44 and contractile spring is under tension when the arms 42 and 44 are in their folded position and thus spring 66 holds the arms 42, 44 and their wheels 48, 50 in folded position. The outwardly-rearwardly formation of the arms 42, 44 as at 52, 54 permits the arms 42—44 to fold around the support 30 and allows the wheels 48, 50 to be positioned in a single plane at the rear of the support 30.

It will of course be understood that various changes may be made in the form, details, arrangement and proportions of the parts without departing from the scope of my invention.

What I claim is:

1. In a golf bag cart comprising in combination, an elongated upstanding member having a forwardly extending handle mounted on the upper portion, a support formed on the lower end of the elongated member extending rearwardly thereof, a plate secured adjacent the lower portion of the elongated member, a pair of arms extending forwardly and outwardly from the plate for a portion of their lengths, then extending outwardly from the plate for the remainder of their lengths, said arms being pivotally connected to the plate so as to move in a horizontal plane, a wheel journalled on the outer end of each of the pivotal arms, the wheels being in parallel planes when the arms are in their extended or operative position, a contractile spring having one end connected to one of the arms between its outer end and its pivot with the opposite end of the spring connected to the other pivotal arm between its outer end and its pivot, the said spring being under tension for aiding in holding the wheels in extended position, said arm pivots permitting the two pivotal arms foldable around the lower end of the elongated member whereby the wheels are located in a single plane at the rear of the support, the said contractile spring crossing the pivots for the two arms when the arms are folded, the said spring being under tension when the arms are in folded position thereby holding the arms and wheels in folded position.

2. In a golf bag cart as set forth in claim 1 wherein latch means comprising a pivotal portion being mounted on one of said arms and a keeper portion being mounted on the other of said arms for securing the two arms in extended position, and wherein adjustable means on the pivotal portion of the latch means coacts with the keeper portion of the latch means for maintaining the wheel assemblies in a relatively non-rattle condition.

3. In a golf bag cart comprising in combination, an elongated upstanding member having a handle mounted on the upper portion, a support formed on the lower end of the elongated member extending rearwardly thereof, a plate secured adjacent the lower portion of the elongated member, a pair of arms extending forwardly and outwardly from the plate for a portion of their lengths, then extending outwardly from the plate for the remainder of their lengths, said arms being pivotally connected to the plate so as to move in a horizontal plane, a wheel journalled on the outer end of each of the pivotal arms, the wheels being in parallel planes when the arms are in their extended or operative position, said arm pivots permitting the two pivotal arms foldable around the lower end of the elongated member whereby the wheels are located at the rear of the support.

4. In a golf bag cart as set forth in claim 3 wherein the folded wheels are located in a single plane at the rear of the support.

References Cited in the file of this patent

UNITED STATES PATENTS

| 1,536,903 | McNaughton | May 5, 1925 |
| 1,802,437 | McHugh | Apr. 28, 1931 |
| 2,326,482 | Moffitt | Aug. 10, 1943 |
| 2,443,847 | Williamson | June 22, 1948 |
| 2,711,152 | McGregor | June 21, 1955 |
| 2,745,673 | Koepke et al. | May 15, 1956 |
| 2,797,927 | Raff | July 2, 1957 |

FOREIGN PATENTS

| 337,647 | France | 1903 |
| 714,363 | Great Britain | Apr. 2, 1953 |